Figure 1:
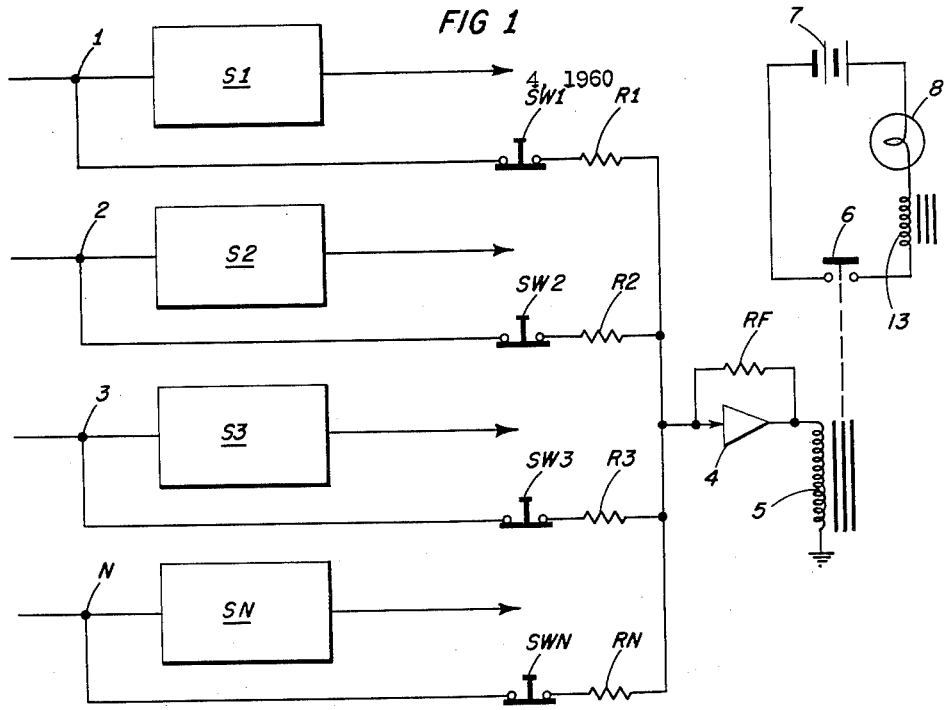

Dec. 11, 1962  E. O. UHRIG ETAL  3,068,460

FAULT DETECTOR AND LOCALIZER

Filed Aug. 4, 1960

INVENTORS
Edward O. Uhrig
Eugene R. Fox

BY
W. O. Quisenberry
Clayde Funkhouser
J. G. Kovelman
ATTORNEYS

3,068,460
FAULT DETECTOR AND LOCALIZER

Edward O. Uhrig, Catonsville, and Eugene R. Fox, Glen Burnie, Md., assignors, by mesne assignments, to the United States of America as represented by the Secretary of the Navy
Filed Aug. 4, 1960, Ser. No. 47,570
2 Claims. (Cl. 340—253)

The present invention relates to electronic fault detectors and localizers and more particularly to a novel fault detecting and localizing circuit capable of simultaneously monitoring the electrical potentials at a plurality of points, all of which may have different permissible levels of error signal toleration.

In recent years, an ever increasing number of servo systems and components have come to be utilized to control various industrial processes and to accomplish a variety of computing functions. With the advent of such widespread servo application, null point monitoring has become increasingly important. Moreover, with modern electronic systems becoming more complex, there is reason to believe that there will be a greater need for easy and rapid detection of faults occurring in such systems. Hence, those concerned with the development of complex electronic system circuitry, and especially those involving computing functions, where precise circuit operation is of optimum concern, have long recognized the need for a simple yet reliable means to monitor such systems for the existence of faults and also provide for rapid isolation of such faults whenever they occur. The present invention fulfills this need.

To attain the above, the present invention contemplates provision of an operational amplifier in the conventional "adder" configuration, with an "add" resistor between each servo null point to be monitored and the input of the operational amplifier. The desired error level to be detected as a fault can be individually regulated for each point of potential being monitored by merely adjusting the relative value of the "add" resistance for that point of potential to the value of the feedback resistance of the operational amplifier. Electrical output from the operational amplifier may be thus utilized to operate a relay or triggering circuit which, in turn, would energize suitable indicating and control networks.

Accordingly, one object of the present invention is the provision of a new and improved electronic fault detector.

Another object is to provide an electronic fault detector capable of simultaneously monitoring electrical potentials at a plurality of points.

A further object of the invention is the provision of an electronic fault detector capable of simultaneously monitoring a plurality of electrical potential points, all having different permissible levels of error signal toleration.

Still another object is to provide an electronic fault detector capable of monitoring complex computer circuits for minor faults which cumulatively exceed the total permissible error level for such systems.

Yet another object of the present invention resides in the provision of an improved simple yet reliable electronic fault detector capable not only of detecting faults in electronic circuits but of also providing rapid isolation of such faults whenever they occur.

Figure 2:
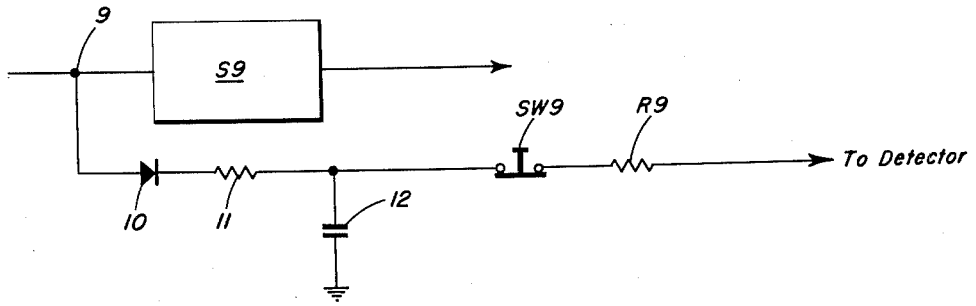

Other objects and many of the attendant advantages of this invention will be readily appreciated as the same becomes better understood by reference to the following detailed description when considered in connection with the accompanying drawings wherein:

FIG. 1 illustrates by electronic schematic diagram one embodiment of an electronic fault detector in accordance with the instant invention and which is capable of simultaneously monitoring a plurality of D.C. potential points; and FIG. 2 illustrates a further embodiment of the instant invention whereby A.C. potential points may also be monitored by the device of the instant invention.

Referring now to the drawings, there is shown in FIG. 1, by way of example, a plurality of servo systems S1, S2, S3, SN, etc., which may be embodied in a suitable process control apparatus or computer circuit, or the like. Each servo system has a null point or point of zero potential level, 1, 2, 3, N, respectively, to be monitored. In the illustrated embodiment, the fault detecting apparatus shown is suitable only for monitoring D.C. potential points, but suitable circuitry for monitoring A.C. potential points, as well, will be subsequently described hereinafter in connection with the description of FIG. 2 of the drawings.

The electronic fault detector of the instant invention comprises basically a high gain operational amplifier unit 4 utilizing a feedback resistor RF connected across the amplifier 4 from the output of the latter back to its input. The fault detector of the instant invention relies upon a unique application of the operational amplifier 4 utilizing the latter in the conventional "adder" computing configuration. "Add" resistors R1, R2, R3, and RN are provided for each of the servo null points 1, 2, 3, and N, respectively, being monitored, each of the latter resistors being connected, as shown in FIG. 1, between its respective null point and the input to the operational amplifier 4. In the "adder" configuration illustrated, the output of operational amplifier 4 may be expressed as:

$$e_0 = -\frac{RF}{R1}e_{S1} - \frac{RF}{R2}e_{S2} - \frac{RF}{R3}e_{S3} \cdots - \frac{RF}{RN}e_{SN} \quad (1)$$

where:

RF is the feedback resistance across operational amplifier 4,

R1, R2, R3, and RN are "add" resistors, $e_0$ is the output voltage from operational amplifier 4, and $e_{S1}$, $e_{S2}$, $e_{S3}$, and $e_{SN}$ represent the electrical potential levels of the points being monitored.

From Equation 1, it is apparent that the output of the operational amplifier 4 in the configuration shown is proportional to the sum of the input voltages from each of the points of potential being monitored and that the magnitude of each of the coefficients of the component output voltages $e_{S1}$, $e_{S2}$, $e_{S3}$, and $e_{SN}$, respectively, is a function of the ratio between the feedback resistor RF of the operational amplifier to the "add" resistor for the particular servo null point under consideration. Thus, it will be understood that selective regulation of the ratio between the "add" and amplifier feedback resistors for each servo loop being monitored enables simultaneous monitoring of different permissible error signal levels in each of a plurality of loops. Similarly, the circuit may be utilized to sum and detect minor error signals in all of the loops, the cumulative effect of which might be to exceed the permissible precision level of circuit performance for the specific system being monitored.

Referring again to FIG. 1 of the drawings, the output of the operational amplifier 4 is directed to a relay coil 5, which, in turn, controls the position of relay contacts 6. The normally open relay contacts 6, upon energization of relay coil 5, close a circuit which includes a source of potential 7 in series with a suitable indicating device 8, which may provide either a visual or aural alarm, and a relay coil 13 which activates suitable circuitry (not shown) to temporarily interrupt the electrical output of the computer or control process apparatus upon detection of a fault.

Faults in servo loops capable of causing the null point of a servo system to deviate from the normal zero potential level may take a variety of forms and include such fault phenomena as amplifier saturation, amplifier failure, broken wires or components, mechanical servo failure, such as excessive friction or a bad motor, servo inputs exceeding design limits, or signals not comparing properly. Each of the foregoing illustrative faults, as well as many others well known in the art, result in the null point of the servo loop to be driven off the null. Such discrepancies will immediately be detected by the output of amplifier 4 and will result in the energization of relay 5 and actuation of its associated alarm or indicating circuitry.

Since tolerable error signal levels in the various servo loops of a system may be widely variant, inasmuch as a variety of functions may be controlled by such servo loops, the effects of variation from the null point in any one specific servo loop may have an effect of varying significance insofar as overall circuit precision of operation is concerned. Therefore, the desired precision of monitoring of each of the servo loops may not always be the same. It is here, that the electronic fault detector of the instant invention provides one of its main advantages, namely, that by merely adjusting the magnitude of the "add" resistance for each servo loop the permissible deviation level of the null point from zero potential before triggering the alarm circuit may be completely and reliably controlled. Similarly, overall circuit performance may be monitored since the electronic fault detecting system shown will inherently monitor the cumulative error, however small, in all of the servo loops.

Isolation of network faults, once detected, is also rather simply and reliably accomplished by the electronic circuit shown in FIG. 1. Each of the monitoring loops S1, S2, S3, and SN is provided with a switch SW1, SW2, SW3, and SWN, respectively, in series with the "add" resistors for its respective servo null point being monitored. When a fault is detected the operator, who may be at a remote location, is informed of the fault by the indicating or alarm circuitry shown in FIG. 1 and may proceed to isolate the fault in the manner next described. The switches SW1, SW2, SW3, and SWN are shown as normally closed push-button switches, and fault isolation is readily accomplished by merely depressing each switch, in turn, to break its respective monitoring branch line, thereby successively interrupting input voltages in each branch to the operational amplifier 4. Thus, when the servo loop performing with excessive error signal level has its monitor loop switch depressed to break the monitoring circuit, the output of amplifier 4 will drop to a level which is insufficient to operate the relay 5 and, therefore, the relay contacts 6 will open to interrupt the alarm or indicating circuit and accomplish accurate fault isolation. Of course, it is to be understood that other types of monitor switching arrangements, obvious to those of ordinary skill in the art, may be utilized without departing from the spirit and scope of the invention.

FIG. 2 of the drawings shows a further embodiment of a servo null point monitoring loop for use with the electronic fault detecting apparatus of the instant invention. A servo system S9 is shown in FIG. 2 having a null point 9 associated therewith, the latter being an A.C. potential point as opposed to the D.C. potential points being monitored by the arrangement illustrated in FIG. 1. The A.C. potential at point 9 is directed to a suitable rectifying arrangement here shown as including a rectifier 10, followed by a suitable ripple filter network comprising the series resistor 11 and shunt capacitor 12, the D.C. output voltage across capacitor 12 being thereafter directed through a monitor loop switch SW9 and a suitable "add" resistor R9 to detector circuitry duplicating that shown in FIG. 1 of the drawings. The monitoring loop arrangement of FIG. 2 may be used interchangeably with the D.C. monitoring loop arrangements shown in FIG. 1, thus enabling both A.C. and D.C. null points to be monitored either separately or simultaneously as a group by a single common fault detector circuit.

The electronic fault detecting circuitry of the instant invention has wide adaptability wherever it is necessary to monitor a plurality of potential points in an electronic system. The fault detector of the instant invention enables faults to be easily and rapidly detected and renders such faults susceptible to ready isolation.

Obviously many modifications and variations of the present invention are possible in the light of the above teachings. It is therefore to be understood, that within the scope of the appended claims, the invention may be practiced otherwise than as specifically described.

What is claimed is:

1. In an electrical system having a plurality of A.C. and D.C. null potential points to be monitored therein, a high gain operational amplifier having an input and an output, a feedback impedance inserted between said input and said output, an "add" resistor connected between each of said D.C. null potential points and the input of said operational amplifier, a rectifier in series with a ripple filter and an "add" resistor connected between each of said A.C. null potential points and the input of said operational amplifier, the ratio of each of said "add" resistors to said feedback impedance being adjusted in accordance with the desired sensitivity of null deviation measurement for each of said null potential points, a normally closed switch inserted in series with each of said "add" resistors, an indicating and interruption circuit, and relay means responsive to the output of said operational amplifier to actuate said indicating and interruption circuit when said output exceeds a prescribed limit.

2. The apparatus of claim 1 wherein said indicating and interruption circuit includes a source of potential in series with an indicator and relay coil means for interrupting the operation of said electrical system.

References Cited in the file of this patent

UNITED STATES PATENTS

| 2,507,916 | Lister | May 16, 1950 |
| 2,714,201 | Whitehead | July 26, 1955 |
| 2,786,988 | Bergman | Mar. 26, 1957 |

OTHER REFERENCES

Korn and Korn: "Electronic Analog Computers," McGraw-Hill Book Co., 2nd ed., pp. 194–195; copyright 1956.